March 27, 1962 A. J. DE VITA 3,027,492
DELAY CIRCUIT
Filed Dec. 29, 1959
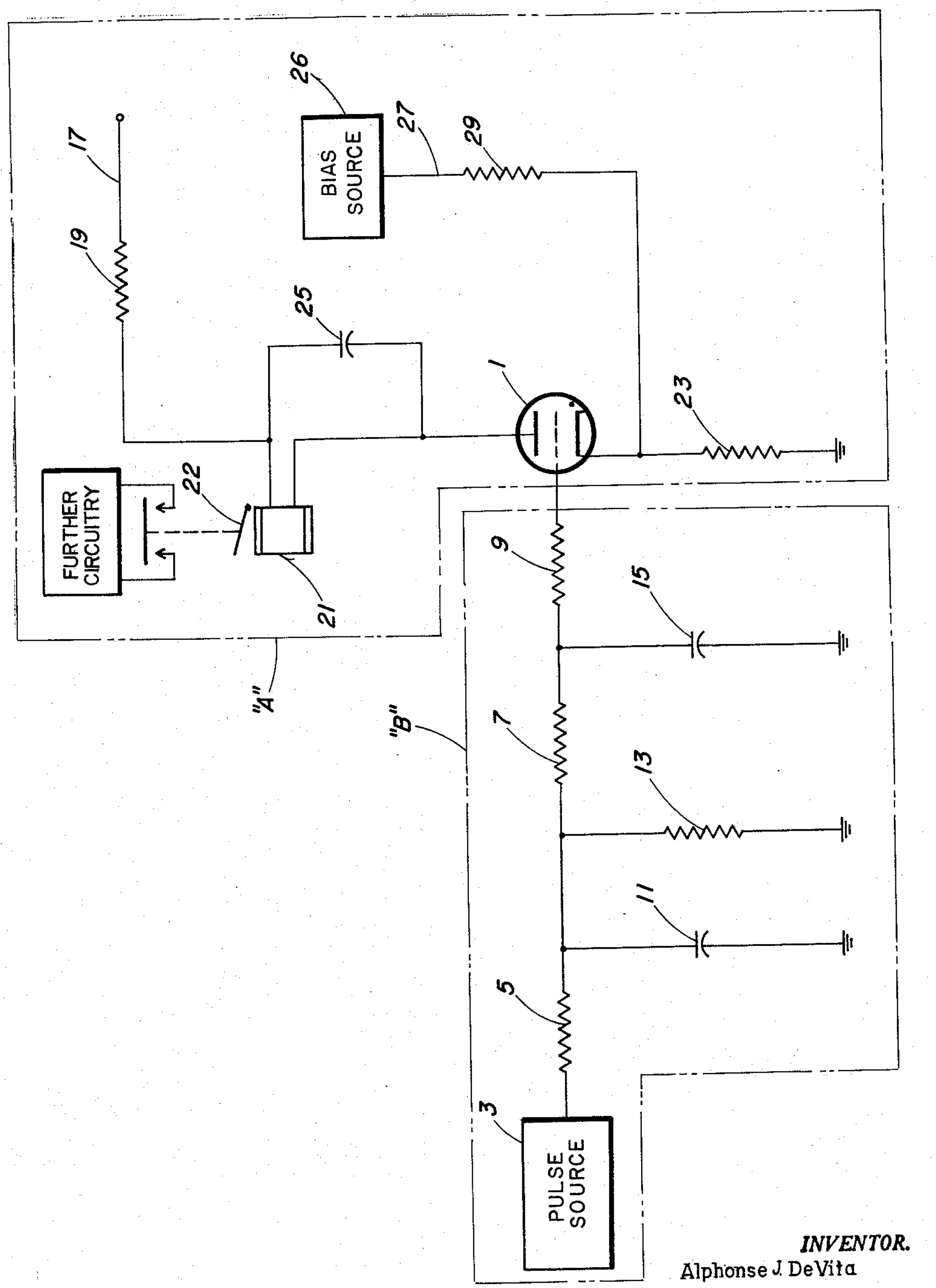
INVENTOR.
Alphonse J. DeVita
BY Arthur W. Collins
ATTORNEY United States Patent Office 3,027,492

Patented Mar. 27, 1962

3,027,492

DELAY CIRCUIT

Alphonse J. De Vita, Bedford, Mass., assignor, by mesne assignments, to the United States of America as represented by the Secretary of the Navy Filed Dec. 29, 1959, Ser. No. 862,738
1 Claim. (Cl. 315—168)

This invention relates to a control circuit for obtaining a delay in a missile firing system having a time constant circuit in combination with a relay circuit.

In control circuits, it is often desirable that electrical or electromagnetic devices be started or stopped immediately upon the receipt of any desired signal input and to keep the electrical or electromagnetic devices functioning at precisely the same rate of operation despite fluctuations or pulsations in the signal current which do not exceed a certain time constant.

Accordingly, it is a principal object of the present invention to provide a novel and improved control circuit wherein the relay, contained therein, is able to energize and de-energize precisely at the same potential to produce accurate relay switching.

Other objects and many of the attendant advantages of this invention will be readily appreciated as the same becomes better understood by reference to the following detailed description when considered in connection with the accompanying drawing wherein:

FIG. 1 is a schematic diagram of a relay control circuit in accordance with the present invention.

As shown therein, the circuit can be considered as being made up of two parts consisting of the thyratron relay circuit A and the time constant circuit B. The circuit B consists of any suitable positive potential pulsing source 3 coupled to the control grid of the thyratron 1 through resistors 5, 7 and 9. The resistor 5 limits the size of the surge of current entering the delay circuit. A capacitor 11 is connected between the juncture of resistors 5, 7 and ground. Resistor 13 is connected between the juncture of capacitor 11, resistor 7 and ground. A delay capacitor 15 is connected between the juncture of resistors 7, 9 and ground. The plate circuit of thyratron 1 extends from the 115 volt 400 cycle supply line 17 through resistor 19, relay 21, thyratron 1, and resistor 23 to ground.

A conductor 27 connects the bias source 26 through the resistor 29 with the cathode of the thyratron 1.

It will be understood that relay 21 will be shunted by suitable means, such as capacitor 25, for holding the relay energized during the alternate half cycle in which no current flows therethrough.

In operation prior to the occurrence of a positive pulse from source 3 to the grid of thyratron tube 1 in the above described circuit, tube 1 is cut off by the negative potential of bias source 26 on its cathode. At system turn on, an A.C. potential is applied to the input of the relay circuit A over lead 17 and a positive potential is initiated at the pulse source 3 of the time constant circuit B. This positive potential passes through the isolating resistor 5, and charges the capacitor 11. This capacitor is employed as a storage capacitor for maintaining the voltage after the pulse source has been removed. The positive potential then charges the capacitor 15 through the resistor 7. Upon receipt of this positive potential by the grid of tube 1 through the isolating resistance 9 from capacitor 15, the tube 1 is caused to change from a non-conducting state to a conducting state due to the overcoming of the biasing potential placed upon the cathode. The biasing potential is supplied to the cathode from the source 26 through the lead 27 and resistor 29. The purpose of resistor 23 which connects the juncture of the source 26 and the cathode of the thyratron tube to ground is to provide a positive bias which, applied to the cathode of the thyratron, is equivalent to a negative voltage applied to the grid thus preventing the thyratron from firing until an input signal of the proper amplitude is received. The resistor 23 also serves as a heater filament to the gas tube 1. The plate current through thyratron 1 energizes the relay 21 thus attracting armature 22 which in turn causes the external control circuits to be closed. The length of time over which thyratron 1 will be cut off after termination of the positive potential from source 3 is determined by the time constant of the delay circuit comprising capacitor 15, resistors 7 and 13, which discharge the capacitor slowly. This offers a method of regulating the length of time that the control circuit remains in the condition determined by the initial firing of thyratron 1 since the values of capacitor 15, resistors 7 and 13 may be set for any determined time interval.

It is apparent that the values selected for the various electrical components of the circuit may be varied in accordance with conventional design considerations. The following exemplary set of values are given as one example of an operation circuit according to the invention whereby a one second delay is obtained in a missile firing system. Resistor 5 has a value of 27 ohms. Capacitor 11 has a value of .56 microfarad and capacitor 15 has a value of .47 microfarad. Resistor 13 has a value of 6.8 megohms and resistor 7 has a value of 3.16 megohms. Resistor 9 has a value of 1 megohm and resistor 19 a value of 5.1 kiloohms. Resistor 29 has a value of 140 ohms so that the 25.5 volts applied at the bias source 26 is dropped to 6.3 volts at the cathode. Capacitor 25 has a value of .22 microfarad. A 115 volt, 400 cycle power supply is applied through lead 17, and 25.5 volts are applied at the pulse source at system turn on. It will be noted that with the method of switching used in this circuit, the relay just responds to zero current or ample current to close it, hence the point at which the thyratron ionizes determines when the relay switches. With A.-C. as the plate potential, the tube is extinguished every half cycle; therefore, the grid potential controls whether the tube will ionize or de-ionize every cycle. Since the cathode is biased up positive with the same voltage that starts it, the circuit compensates for D.C. voltage fluctuations. A decrease in the bias would cause the tube to fire lower, but the start voltage has also decreased, hence the delay will remain the same.

Obviously many modifications and variations of the present invention are possible in the light of the above teachings. It is therefore to be understood that within the scope of the appended claim the invention may be practiced otherwise than as specifically described herein.

What is claimed is:

In a missile firing system a gas discharge tube having a plate, a cathode and a control grid; a relay; a plate resistor; a cathode resistor; an alternating current source;

a circuit which connects in series the plate resistor, the relay, the gas discharge tube and the cathode resistor across the alternating current source; a condenser connected in parallel with the relay; a positive direct current biasing source coupled to the cathode of the gas discharge tube; a control direct current pulsing source; a first integration circuit having a short time constant coupled to the output of the pulsing source; a second integration circuit having a predetermined longer time constant coupled between the output of the first integration circuit and the control grid of the gas discharge tube; and a resistor connected between the junction of the first and second integration circuits and ground.

References Cited in the file of this patent

UNITED STATES PATENTS

| | | |
|---|---|---|
| 2,567,928 | Farmer | Sept. 18, 1951 |
| 2,751,500 | Robinson | June 19, 1956 |
| 2,809,297 | Hartwig et al. | Oct. 8, 1957 |
| 2,847,572 | Favin | Aug. 12, 1958 |
| 2,869,038 | McCord | Jan. 13, 1959 |
| 2,907,012 | Pitman et al. | Sept. 29, 1959 |